(12) United States Patent
Maeda et al.

(10) Patent No.: US 7,274,314 B2
(45) Date of Patent: Sep. 25, 2007

(54) CHARACTER-INFORMATION CONVERSION APPARATUS AND METHOD FOR CONVERTING CHARACTER INFORMATION

(75) Inventors: Kazuhiko Maeda, Saitama (JP); Koichiro Watanabe, Saitama (JP)

(73) Assignee: Sony Corporation, Tokyo (JP)

( * ) Notice: Subject to any disclaimer, the term of this patent is extended or adjusted under 35 U.S.C. 154(b) by 226 days.

(21) Appl. No.: 11/175,427

(22) Filed: Jul. 5, 2005

(65) Prior Publication Data

US 2006/0050977 A1     Mar. 9, 2006

(30) Foreign Application Priority Data

Jul. 15, 2004    (JP)    ............... 2004-208029

(51) Int. Cl.
*H03M 7/00*        (2006.01)
(52) U.S. Cl. ............... 341/90; 341/51; 341/99
(58) Field of Classification Search ............ 341/51, 341/55, 90, 106; 345/467, 468, 471; 707/100, 707/219
See application file for complete search history.

(56) References Cited

U.S. PATENT DOCUMENTS

| | | | | |
|---|---|---|---|---|
| 5,479,167 A | * | 12/1995 | Murakami | 341/90 |
| 5,699,524 A | * | 12/1997 | Ooishi et al. | 709/246 |
| 6,204,782 B1 | * | 3/2001 | Gonzalez et al. | 341/90 |
| 6,266,070 B1 | * | 7/2001 | Shigi et al. | 345/467 |
| 6,310,624 B1 | * | 10/2001 | Watanabe | 345/467 |
| 6,701,320 B1 | * | 3/2004 | Marple | 707/100 |
| 6,999,082 B2 | * | 2/2006 | Nishimura | 345/467 |
| 7,002,581 B2 | * | 2/2006 | Shimamura | 345/467 |
| 7,199,730 B2 | * | 4/2007 | Matsuda | 341/55 |
| 7,215,264 B2 | * | 5/2007 | Salwan et al. | 341/106 |

FOREIGN PATENT DOCUMENTS

| | | |
|---|---|---|
| JP | 5-2576 | 1/1993 |
| JP | 2002-41402 | 2/2002 |
| JP | 2003-217270 | 7/2003 |
| JP | 2004-106255 | 4/2004 |
| JP | 2004-127363 | 4/2004 |

* cited by examiner

*Primary Examiner*—Linh V. Nguyen
(74) *Attorney, Agent, or Firm*—Oblon, Spivak, McClelland, Maier & Neustadt, P.C.

(57) ABSTRACT

A character-information conversion apparatus is configured to process character information including attribute information indicating a coding system and character codes conforming to the coding system and for converting the character codes into characters. The apparatus includes a key operation unit, an EEPROM, and a controlling unit. The key operation unit specifies a coding system to be applied to decode character codes conforming to a coding system other than a normally applied coding system. The EEPROM stores information indicating the coding system corresponding to the received input. The controlling unit refers to the attribute information and determines which coding system the character codes conforms to, converts the character codes into characters based on the information stored in the EEPROM when it is incapable of determining the coding system or when it is determined that the coding system differs from the normally applied coding system.

9 Claims, 7 Drawing Sheets

FIG. 2A

SHIFT JIS (HIGHER ORDER BYTE)

| LOWER ORDER \ HIGHER ORDER | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | | | | | | | | | | | | | | | | |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | USED |
| 6 | | | | | | | | | | | | | | | | |
| 7 | | | UNUSED | | | | | | USED | | UNUSED | | | | USED | |
| 8 | | | | | | | | | | | | | | | | |
| 9 | | | | | | | | | | | | | | | | |
| A | | | | | | | | | | | | | | | | |
| B | | | | | | | | | | | | | | | | |
| C | | | | | | | | | | | | | | | | |
| D | | | | | | | | | | | | | | | | UN-USED |
| E | | | | | | | | | | | | | | | | |
| F | | | | | | | | | | | | | | | | |

FIG. 2B

SHIFT JIS (LOWER ORDER BYTE)

| LOWER ORDER \ HIGHER ORDER | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | | | | | | | | | | | | | | | | |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | USED |
| 6 | | | | | | | | | | | | | | | | |
| 7 | | UNUSED | | | USED | | | USED | | | USED | | | | | |
| 8 | | | | | | | | | | | | | | | | |
| 9 | | | | | | | | | | | | | | | | |
| A | | | | | | | | | | | | | | | | |
| B | | | | | | | | | | | | | | | | |
| C | | | | | | | | | | | | | | | | |
| D | | | | | | | | | | | | | | | | UN-USED |
| E | | | | | | | | | | | | | | | | |
| F | | | | | | | | | | | | | | | | |

FIG. 3

ISO8859-1

| LOWER ORDER \ HIGHER ORDER | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | UNUSED | | | 0 | @ | P | ` | p | UNUSED | | | ° | À | Ð | à | ð |
| 1 | | | ! | 1 | A | Q | a | q | | | ¡ | ± | Á | Ñ | á | ñ |
| 2 | | | " | 2 | B | R | b | r | | | ¢ | ² | Â | Ò | â | ò |
| 3 | | | # | 3 | C | S | c | s | | | £ | ³ | Ã | Ó | ã | ó |
| 4 | | | $ | 4 | D | T | d | t | | | ¤ | ´ | Ä | Ô | ä | ô |
| 5 | | | % | 5 | E | U | e | u | | | ¥ | µ | Å | Õ | å | õ |
| 6 | | | & | 6 | F | V | f | v | | | ¦ | ¶ | Æ | Ö | æ | ö |
| 7 | | | ' | 7 | G | W | g | w | | | § | · | Ç | × | ç | ÷ |
| 8 | | | ( | 8 | H | X | h | x | | | ¨ | ¸ | È | Ø | è | ø |
| 9 | | | ) | 9 | I | Y | i | y | | | © | ¹ | É | Ù | é | ù |
| A | | | * | : | J | Z | j | z | | | ª | º | Ê | Ú | ê | ú |
| B | | | + | ; | K | [ | k | { | | | « | » | Ë | Û | ë | û |
| C | | | , | < | L | ¥ | l | | | | | ¬ | ¼ | Ì | Ü | ì | ü |
| D | | | - | = | M | ] | m | } | | | | ½ | Í | Ý | í | ý |
| E | | | . | > | N | ^ | n | ~ | | | ® | ¾ | Î | Þ | î | þ |
| F | | | / | ? | O | _ | o | | | | ¯ | ¿ | Ï | ß | ï | ÿ |

FIG. 4

(1) SHIFT JIS

"89EF  8ED0"
  ↓      ↓
  会     社

(2) ISO8859-1

"89 EF  8E D0"
 ↓  ↓   ↓  ↓
 NO  Ï   NO  Ð
 CORRESPONDING   CORRESPONDING
 CHARACTER       CHARACTER

CHARACTER-INFORMATION CONVERSION APPARATUS AND METHOD FOR CONVERTING CHARACTER INFORMATION

CROSS REFERENCES TO RELATED APPLICATIONS

The present invention contains subject matter related to Japanese Patent Application JP 2004-208029 filed in the Japanese Patent Office on Jul. 15, 2004, the entire contents of which are incorporated herein by reference.

BACKGROUND OF THE INVENTION

1. Field of the Invention

The present invention relates to an apparatus and a method for converting text data (character information) represented by various different coding systems, such as the Shift-JIS coding system or the ISO8859-1 coding system, into characters to be output.

2. Description of the Related Art

Personal computers and various other electronic apparatuses are used to process text data. In general, text data is based on two coding systems: a two-byte coding system in which one character is represented by two bytes (16 bits) of data; and a one-byte coding system in which one character is represented by one byte (eight bits) of data.

For example, when creating a database of addresses in a hard disk of a personal computer, in some cases, either one-byte data or two-byte data may be used for inputting data on items such as "name" and "home address." When one-byte text data and two-byte text data both exist, it must be determined whether the text data input for the item is one-byte text data or two-byte text data in order to check the validity of the text data and to convert the text data into characters.

Japanese Unexamined Patent Application Publication No. 04-150112 discloses a technology for determining whether the text data corresponding to an item is one-byte text data or two-byte text data and for appropriately checking the text data corresponding to the item. By using the technology described in this document, it is correctly determined whether text data corresponding to an item to be processed is one-byte text data or two-byte text data and is appropriately processed even when one-byte text data and two-byte text data both exist.

Text data generally includes attribute information indicating the coding system and character codes corresponding to characters. By referring to the attribute information, the coding system of the text data can be determined. In this way, appropriate processing for the coding system can be carried out.

However, on rare occasions, the coding system indicated by the attribute information differs from the coding system of the character codes. For example, there is a standard for compact disks (CDs) known as CD-Text. By conforming to this standard, additional information concerning the CD, such as the title, the name of the artist, the name of the lyric writer, the name of the composer, the name of the arranger, and other information, can be recorded in the R to W channels of the sub-code included in the read-in area track of the CD as text data (character information).

When music data and text data that correspond to the music data recorded on a CD and conforms to the CD-Text standard are copied as a set for personal use, depending on the application program used, the character codes included in the text data may be directly copied whereas the attribute information indicating the coding system of the character codes may be automatically changed into a coding system mainly used by the application program, such as a two-byte coding system.

If such change occurs when the copied character codes are based on a one-byte coding system, the coding system indicated by the attribute information will differ from the actual coding system of the character codes. As a result, it will become difficult to correctly and quickly check the character codes and convert (decode) the character codes into characters.

An audio data file (MPEG-1 Audio Layer-3 (MP3) file) conforming to the MP3 standard can be purchased via a network, such as the Internet. In the case of an MP3 file, a format known as ID3 tags is used to add text data (character information), such as the title of the music, the name of the composer, and the genre of the music, to the file. However, a standard known as the version 1 ID3 tag for MP3 does not include attribute information indicating the coding system of the character codes.

For this reason, the coding system for the text data added to an MP3 file using the version 1 ID3 tag is unknown. Therefore, it becomes difficult to correctly and quickly check the character codes and convert (decode) the character codes into characters.

SUMMARY OF THE INVENTION

By taking into consideration the above-described problems, the apparatus and method according to an embodiment of the present invention can correctly convert character codes of text data including attribute information and character codes in accordance with a coding system even when the coding system indicated by the attribute information differ from the actual coding system of the character codes.

A character-information conversion apparatus according to an embodiment of the present invention includes receiving means, storage means, determining means, and conversion means. The character-information conversion apparatus is for processing character information including attribute information indicating a coding system and character codes conforming to the coding system and for converting the character codes into characters. The receiving means is for receiving an input for specifying a coding system to be applied when decoding character codes conforming to a coding system other than a normally applied coding system. The storage means is configured to store information indicating the coding system corresponding to the input received via the receiving means. The determining means is configured to refer to the attribute information of the character information to be converted and determining which coding system the character codes of the character information conform to. The conversion means is configured to convert the character codes into characters based on the information stored in the storage means when the determining means is incapable of determining the coding system or when the determining means determines that the coding system determined by referring to the attribute information differs from the normally applied coding system.

According to the character-information conversion apparatus according to an embodiment of the present invention, information indicating the coding system used when decoding character codes based on a coding system other than the normally used coding system is stored in the storage means via the receiving means. When the determining means determines that the coding system of the character code of the character information to be converted is unknown or differs from the normally used coding system, the converting means converts the character codes of the character information into characters based on the information indicating the coding system stored in the storage means.

In this way, even when the coding system of the character code is unknown or differs from the normally used coding system the character codes can be processed based on the coding system selected by the user and stored in advance. Accordingly, a case in which the coding system indicating the attribute information of the character information differs from the actual coding system of the character code is detected to prevent the generation of garbled characters.

In the character-information conversion apparatus according to an embodiment of the present invention, the detection means for detecting whether the character codes included in the character information includes character codes not included in a coding system other than the normally applied coding system when the determining means determines that the coding system indicated by the attribute information differs from the normally applied coding system, and the conversion means converts the character codes into characters based on the information stored in the storage means when the determining means determines that the coding system indicated by the attribute information differs from the normally applied coding system and when the detection means detects that the character information includes character codes not included in a coding system other than the normally applied coding system.

In this way, when the determining means determines that the attribute information indicating a coding system of the character information to be converted differs from the normally used coding system, the detection means detects whether or not the character code of the character information to be converted includes character codes that are not used. If such character codes are detected, the conversion means converts the character code of the character information based on the information indicating the coding system stored in the storage means.

Accordingly, the coding system indicated by the attribute information of the character information reliably detects a case in which the coding system indicating the attribute information of the character information differs from the actual coding system of the character code is detected to prevent the generation of garbled characters, and thus, the character information is decoded appropriately.

In the character-information conversion apparatus according to an embodiment of the present invention, the normally applied coding system is a two-byte coding system and the coding system other than the normally applied coding system is a one-byte coding system.

In this way, when coding system of the character codes of the character information to be converted is not a two-byte coding system, which is the normally used coding system, a one-byte coding system can be used. Moreover, even when the character codes are based on a one-byte coding system, the character codes can be converted appropriately.

In the character-information conversion apparatus according to an embodiment of the present invention, the normally applied coding system is a one-byte coding system and the coding system other than the normally applied coding system is a two-byte coding system.

In this way, when coding system of the character codes of the character information to be converted is not a one-byte coding system, which is the normally used coding system, a two-byte coding system can be used. Moreover, even when the character codes are based on a two-byte coding system, the character codes can be converted appropriately.

The character coding system indicated by the attribute information included in character information (text data) and the character codes corresponding to the attribute information are recorded mistakenly, the generation of garbled characters can be prevented.

BRIEF DESCRIPTION OF THE DRAWINGS

FIG. 2 illustrates a character map for Shift-JIS;

FIG. 3 illustrates a character map for ISO8859-1;

FIG. 4 illustrates examples of so-called 'garbled characters';

DESCRIPTION OF THE PREFERRED EMBODIMENTS

An apparatus and method according to embodiments of the present invention will be described below with reference to the drawings. As an apparatus according to an embodiment of the present invention, a reproduction apparatus (CD player) capable of reproducing data recorded on a CD conforming to the CD-Text standard will be described below.

[Overview of Disk Reproduction Apparatus]

Figure 1:
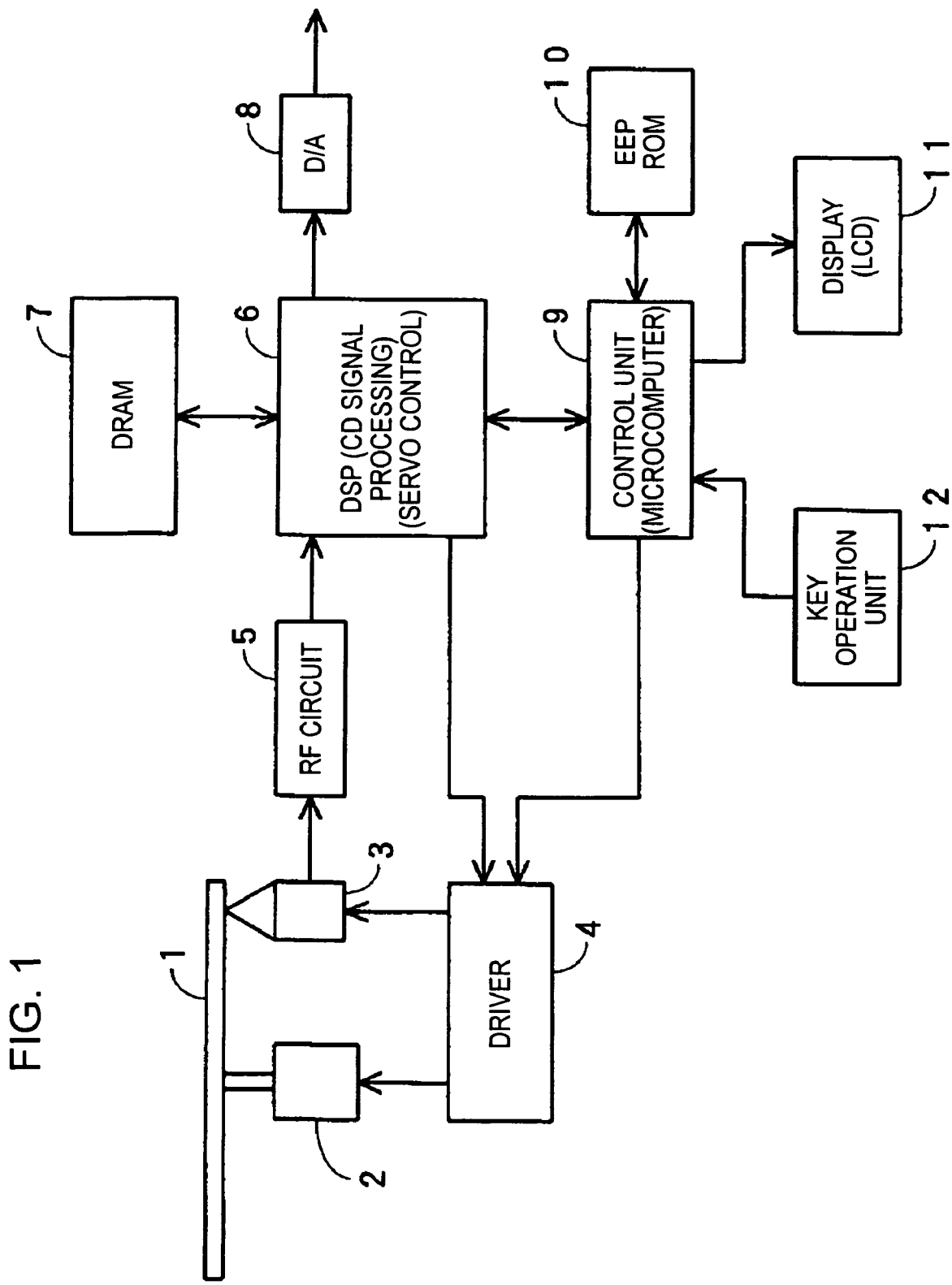
FIG. 1 is a block diagram of a disk reproduction apparatus according to an embodiment of the present invention.

FIG. 1 is a block diagram of the disk reproduction apparatus. As illustrated in FIG. 1, a CD, i.e., a disk 1, is loaded on the disk reproduction apparatus.

The disk reproduction apparatus illustrated in FIG. 1 includes a spindle motor 2, an optical pick-up unit 3, a driver 4, a radio frequency (RF) circuit 5, a digital signal processor (DSP) 6, a dynamic random access memory (DRAM) 7, a digital/analog (D/A) converter 8, a controlling unit 9, a electrically erasable and programmable read only memory (EEPROM) 10, a display apparatus 11, and a key operation unit 12.

The spindle motor 2 rotates the disk 1. The optical pick-up unit 3 emits a laser beam used as reproduction power onto the disk and reads out data stored in the disk by receiving the reflected beam. More specifically, although not shown in the drawing, the optical pick-up unit 3 includes a laser diode, which is the source of the laser beam emitted onto the disk, an objective lens, a light detector, such as photodetector, for receiving the laser beam reflected at the disk, a focus coil constituting a biaxial actuator, a tracking coil, and a sled motor for moving the optical pick-up unit 3 in the radial direction of the disk.

The driver 4 generates a driving signal in accordance with a servo control signal sent from the DSP 6 or a drive control signal sent from the controlling unit 9, as described below, and sends the driving signal to the spindle motor 2, the laser diode of the optical pick-up unit 3, the sled motor, the focus coil, and the tracking coil to drive these units.

The RF circuit 5 generates a reproduction signal (pull-in signal), a focus error signal FE, a tracking error signal TE based on an electrical signal from the optical pick-up unit 3 responding to the laser beam reflected from the disk and supplies these generated signals to the DSP 6.

The DSP 6 generates a servo control signal to be supplied to the driver 4 in response to the focus error signal FE and the tracking error signal TE. Then, the DSP 6 generates a reproduction signal (reproduction audio signal) to be supplied to the D/A converter 8 by supplying the servo control signal to the driver 4 or by decoding the reproduction signal from the RF circuit 5. Then, the reproduction signal generated at the DSP 6 is supplied to the D/A converter 8.

In other words, the DSP 6 carries out CD signal processing for generating an output audio signal by carrying out demodulation in response to the modulation performed on the reproduction signal sent from the RF circuit 5 and carries out servo control processing for generating a servo control signal to be supplied to the driver 4 in response to the focus error signal FE and tracking error signal TE. The DRAM 7 is a temporary memory for storing data to be processed during reproduction.

The D/A converter 8 receives a reproduction audio signal from the DSP 6, converts this digital signal into an analog audio signal, and supplies the analog signal to a speaker via an amplifier. In this way, audio corresponding to the reproduction audio read out from the disk 1 is reproduced through the speaker.

The controlling unit 9 is a microcomputer connected to a central processing unit (CPU), a ROM, and a RAM, which are not shown in the drawing, via a bus. The controlling unit 9 controls each unit of the disk reproduction apparatus. As illustrated in FIG. 1, the EEPROM 10, which is a non-volatile memory, the display apparatus 11; and the key operation unit 12 are connected to the controlling unit 9. In response to the operation by the user input through the key operation unit 12, the controlling unit 9 carries out various controls of the units, such as 'play,' 'fast-forward,' 'fast-rewind,' 'pause,' and 'stop.'

The EEPROM 10 stores various types of information even after the power of the disk reproduction apparatus is shut off. The EEPROM 10 stores various setting parameters. The display apparatus 11 according to this embodiment is a liquid crystal display (LCD) and displays information, such as conditional information and warning information, under the control of the controlling unit 9.

When the controlling unit 9 receives a reproduction command from the user via the key operation unit 12, the controlling unit 9 controls the driver 4 to drive the spindle motor 2 and the optical pick-up unit 3. In such a case, a laser is illuminated by the reproduction power, the optical pick-up unit 3 is moved to the address specified by the user for reproduction, and the data recorded in the disk is read out. The read out data is temporarily sent to the DRAM 8 from the RF circuit 5 via the DSP 6. Then, the data is read out in sequence from the DSP 6 and is supplied to the speaker via the D/A converter 8 for reproduction.

As described above, the disk reproduction apparatus according to this embodiment reads out text data recorded in a read-in area of the disk 1, which according to this embodiment is a CD conforming to the CD-Text standard. Then, character information corresponding to the read out text data is displayed on the screen of the display apparatus 11.

The text data read out from the read-in area of the disk 1 via the optical pick-up unit 3 is supplied to the controlling unit 9 via the RF circuit 5 and the DSP 6. The text data is converted (decoded) into character information for display at the controlling unit 9 and is supplied to the display apparatus 11. Characters corresponding to the character codes of the text data are displayed on the screen of the display apparatus 11.

[Generation of Garbled Characters]

As described above, the text data read out from the read-in area of the disk 1 via the optical pick-up unit 3 is supplied to the controlling unit 9 via the RF circuit 5 and the DSP 6. The text data is converted (decoded) into character data for display at the controlling unit 9 and is supplied to the display apparatus 11. Before this process, the disk reproduction apparatus according to this embodiment carries out a check-out at the controlling unit 9.

As described above, the text data includes attribute information and character codes. The attribute information indicates a coding system of the character codes. On rare occasions, the coding system indicated by the attribute information may differ from the actual coding system of the character codes, causing garbled characters to be generated. For this reason, in the disk reproduction apparatus according to this embodiment, the text data is checked before being decoded and converted into to character information.

An exemplary process of the generation of garbled characters will be described in detail below. FIG. 2 illustrates the character map (character conversion table) of Shift-JIS, which is a two-byte character coding system. FIG. 3 illustrates the character map (character conversion table) of ISO8859-1, which is a one-byte character coding system.

Since Shift-JIS is a two-byte character coding system, one character is represented by two bytes of data: one byte (8 bits) of data (i.e., a higher order byte of data) including 4 bits of higher order data (0h to Fh) and 4 bits of lower order data (0h to Fh), as illustrated in FIG. 2A and one byte (8 bits) of data (i.e., a lower order byte of data) including 4 bits of higher order data (0h to Fh) and 4 bits of lower order data (0h to Fh), as illustrated in FIG. 2B.

Since ISO8859-1 is a one-byte character coding system, one character is represented by 1 byte (8 bits) of data including 4 bits of higher order data (0h to Fh) and 4 bits of lower order data (0h to Fh), as illustrated in FIG. 3. The character 'h' presented together with a number or a capital alphabet letter A to F, such as '0h' and 'Fh,' indicates that the character placed in front of the character 'h' represents a hexadecimal number (such hexadecimal representation will be used throughout this document).

Since many kanji characters are used in Japanese, Shift-JIS is often used. For English and other European languages, ISO8859-1 is often used.

FIG. 4 illustrates the difference in the representation of characters according to Shift-JIS and ISO8859-1. Using the Shift-JIS two-byte coding system, the Japanese kanji characters '会社' are represented as '89EF8ED0,' as illustrated in FIG. 4. In this case, the two bytes of data '89EF' represents the kanji character '会' and the two bytes of data '8ED0' represents the kanji character '社.'

Accordingly, when the character codes '89EF8ED0' are converted into characters using the Shift-JIS two-byte coding system, the character codes are correctly converted into the kanji characters '会社.' However, if the character codes '89EF8ED0' are converted based on the character map of the one-byte coding system ISO8859-1, the character codes '89' and '8E' will not be converted because there are no characters corresponding to the character codes '89' and '8E,' as shown in FIG. 4, and the character codes 'EF' and 'D0' correspond to unfamiliar characters.

Accordingly, when the coding system indicated by the attribute information included in the text data differs from the actual character coding system of the character codes, garbled characters will be generated. As a result, the user will not be able to obtain important information such as the name of the artist and the title. Therefore, as described above, a checkout is carried out at the controlling unit 9 before the text data is converted into characters and displayed on the screen of the display apparatus 11.

The disk reproduction apparatus according to this embodiment carries out character conversion using a character map of a two-byte coding system when the text data to be converted is determined to be based on a two-byte coding system by checking the attribute information of the text data. If the attribute information of the text data indicates that the text data includes one-byte character codes (based on a one-byte coding system), the controlling unit 9 checks the character codes of the supplied text data one byte at a time to determine whether there is a code (value) that is not included in the one-byte coding system.

When a value that is not included in the one-byte coding system is detected, the text data is converted using a coding system selected by the user. More specifically, the text data is converted (decoded) into display information (character display information) using a decoding method specified by the user, the display information is sent to the display apparatus 11, and characters corresponding to the display information is displayed on the display apparatus 11. If all of the values are included in the one-byte coding system, the text data is decoded in accordance with the character map of the coding system indicated by the attribute information, the display data is supplied to the display apparatus 11, and characters corresponding to the display data are displayed on the screen of the display apparatus 11.

As described above, the disk reproduction apparatus according to this embodiment normally uses the Shift-JIS two-byte coding system to display Japanese text. However, when the attribute information of the text data to be converted into characters does not indicate the Shift-JIS coding system, the disk reproduction apparatus uses a character map of a coding system selected by the user in advance to convert the text data into characters. In this way, generation of garbled characters can be minimized.

[Process for Setting Character Coding System]

Next, the process for the user to specify the character coding system to be applied in a disk reproduction apparatus capable of decoding text data stored on a CD conforming to the CD-Text standard and displaying the decoded character information on the screen of a display apparatus 11 when the character coding system indicated by the attribute information of the text data to be processed differs from the normally applied character coding system will be described below with reference to the flow chart illustrated in FIG. 5.

Figure 5:
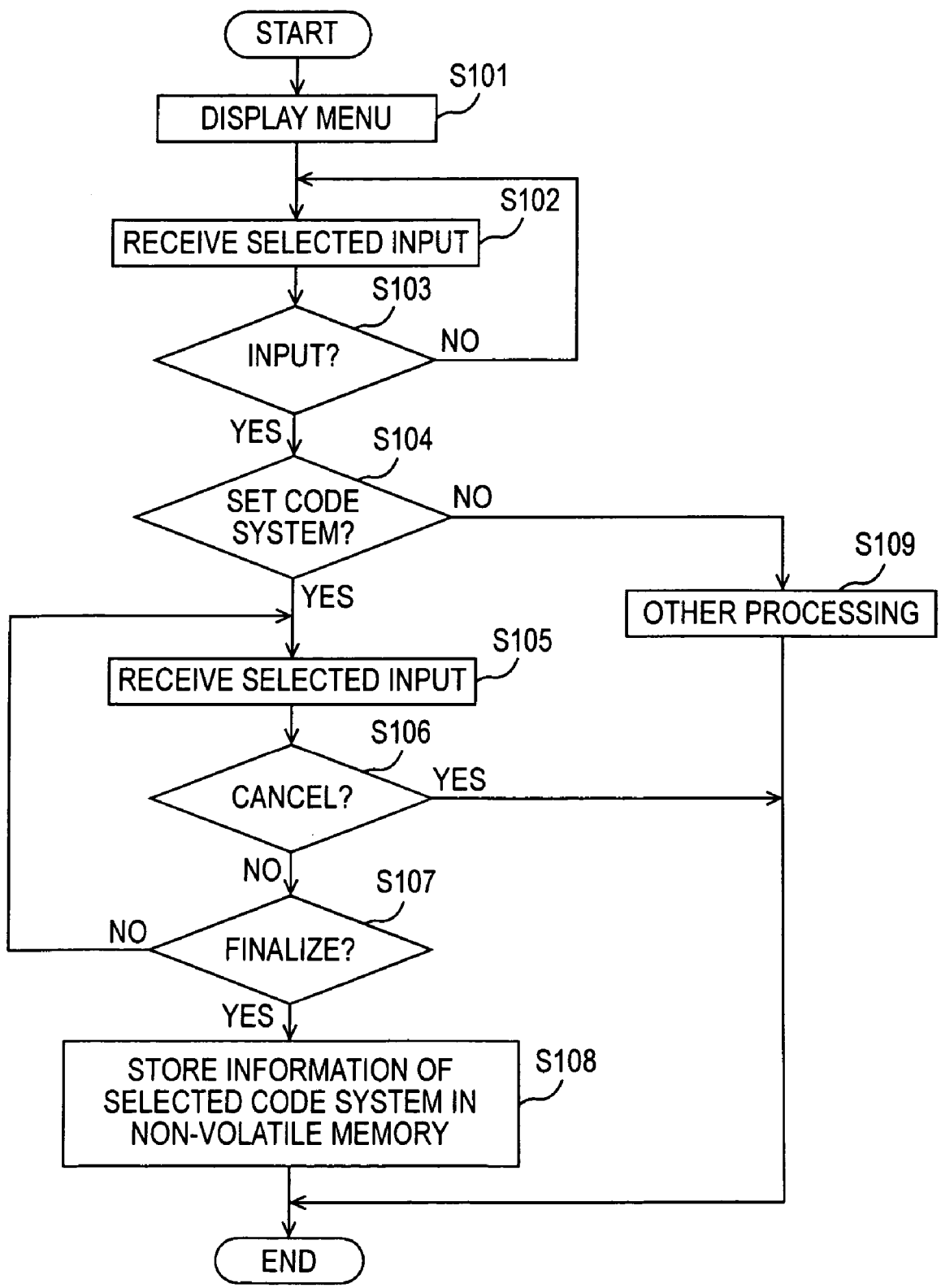
FIG. 5 is a flow chart illustrating a process for specifying a coding system.

The process illustrated in FIG. 5 is carried out in a controlling unit 9 of the disk reproduction apparatus when, for example, predetermined operations for specifying basic settings (initial settings), such as specifying the calendar function (setting the current time and date) and specifying the coding system to be applied when the coding system indicated by the attribute information of the text data differs from the normally applied coding system, are carried out.

First, the controlling unit 9 displays a menu on the screen of the display apparatus 11 based on display information stored in a ROM (Step S101) and prepares for receiving an input of an item corresponding to the process to be executed selected by the user from the menu (Step S102). Then, the controlling unit 9 waits for the user to select an item to be input (Step S103). When the input is received, the controlling unit 9 determines whether the menu item corresponding to the process for specifying the coding system has been selected (Step S104).

If, in Step S104, the controlling unit 9 determines that the menu item corresponding to the process for specifying the coding system has been selected, then the controlling unit 9 receives inputs for the series of operations that are carried out to specify a coding system, such as selecting a coding system, canceling the selected coding system, and finalizing the selection of the coding system (Step S105). The controlling unit 9 determines whether an input for canceling the selected coding system has been received (Step S106). If the controlling unit 9 determined that a cancellation has not been received, it is then determined whether the select input has been finalized (Step S107).

If, in Step S107, the controlling unit 9 determines that the select input has not been finalized, the process is returned to Step S105. If, in Step S107, the controlling unit 9 determines that the selected coding system has been finalized, the information that indicates the coding system received in Step S105 is stored in a non-volatile memory of the controlling unit 9, which according to this embodiment, is an EEPROM 10 (Step S108). Then, the process illustrated in FIG. 5 is completed.

If, in Step S104, the controlling unit 9 determines that the selected menu item is not a menu item corresponding to the process for specifying a coding system, a process corresponding to the selected menu item will be carried out (Step S109). Then, the process illustrated in FIG. 5 is completed. If, in Step S106, the controlling unit 9 determines that the selected coding system has been cancelled after an input for the selected coding system has been received, the process for specifying the coding system is not carried out. Then, the process illustrated in FIG. 5 is completed.

Accordingly, the coding system to be applied when the coding system indicated by the attribute information of the text data stored in a disk differs from the actual coding system of the character codes of the text data can be specified by the user for the disk reproduction apparatus according to this embodiment.

According to this embodiment, the character coding system that can be selected by the user includes the following character coding systems: 1) auto (automatic setting); 2) Japanese (Shift-JIS); 3) Korean (KSX1001); 4) simplified Chinese characters used in mainland China (GB18030); 5) traditional Chinese characters used in Taiwan (Big5); 6) English (ISO8859-1 or ASCII); and 7) Russian (ISO8859-1).

If 'auto' is selected, the coding system is automatically set to a predetermined coding system corresponding to the language used in point of destination of the disk reproduction apparatus (i.e., the country the disk reproduction apparatus is shipped to). In other words, the information indicating the coding system applied when 'auto' is selected, for example, is stored in the EEPROM 10. When 'auto' is selected, the coding system indicated by the information stored in the EEPROM 10 is set as the coding system to be applied when the coding system indicated by the attribute information of the text data differs from the normally applied coding system.

[Processing Carried Out During Decoding of Text Data]

Figure 6:
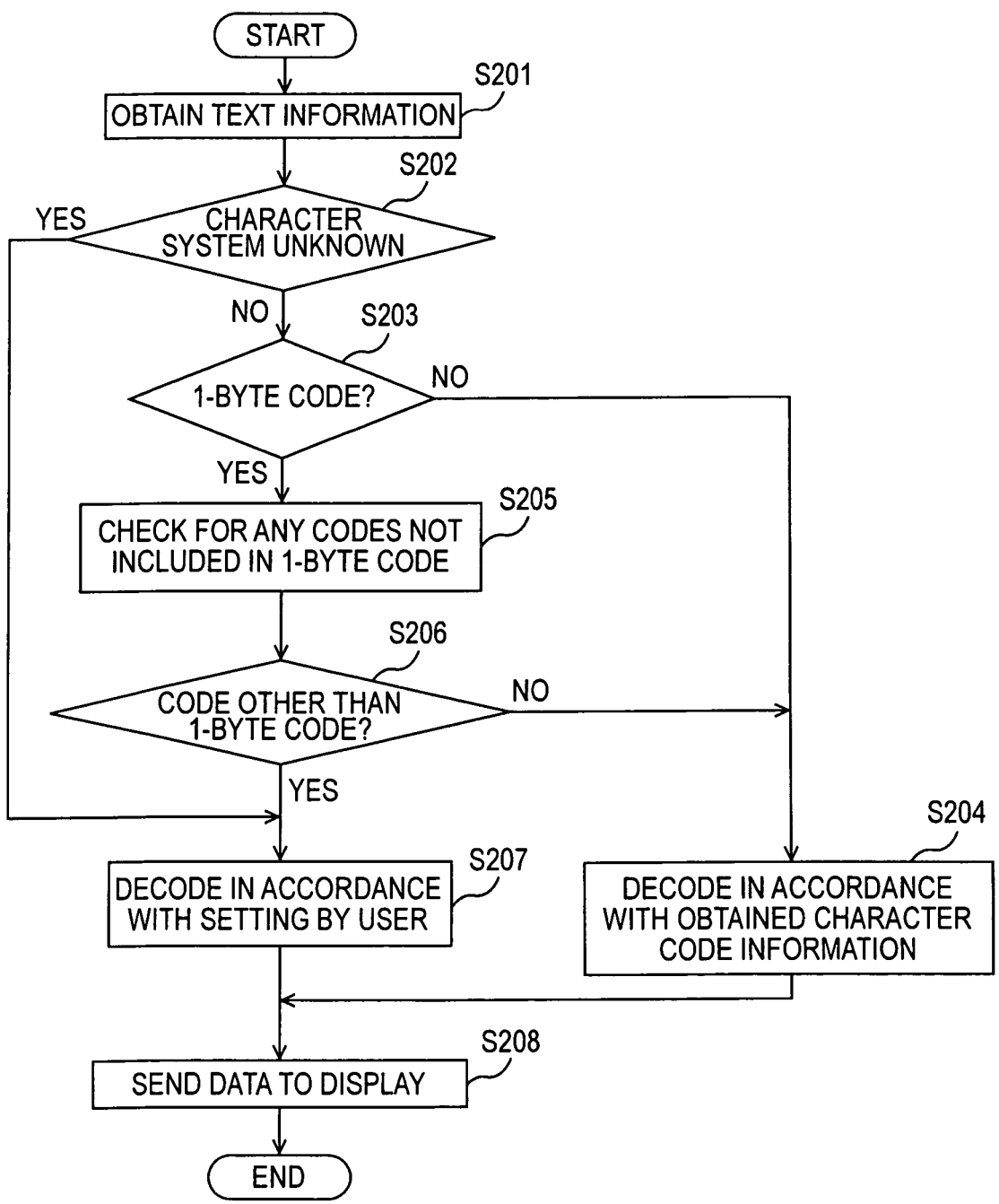
FIG. 6 is a flow chart illustrating a decoding process for text data.

Next, the decoding process of text data carried out at a disk reproduction apparatus according to an embodiment of the present invention will be described in detail with reference to the flow chart illustrated in FIG. 6. FIG. 6 illustrates a flow chart of the process of reading out text data stored in a disk loaded on the disk reproduction apparatus and decoding the text data. For example, this process is carried out mainly at the controlling unit 9 when the disk is loaded on the disk reproduction apparatus or when the user instructs the process to be carried out.

The disk reproduction apparatus according to this embodiment is manufactured mainly for use in Japan and Shift-JIS is the character coding system normally applied for processing text data.

When the process illustrated in FIG. 6 is carried out at the controlling unit 9, the controlling unit 9 reads out text data from the disk 1 loaded on the disk reproduction apparatus via the optical pick-up unit 3, the RF circuit 5, and the DSP 6 (Step S201). Then, the controlling unit 9 refers to the attribute information included in the read out text data and determines whether the character coding system of the text data is known or unknown (Step S202).

If, in Step S202, the controlling unit 9 determines that the character coding system of the text data is known, then the controlling unit 9 determines whether or not the coding system is a one-byte coding system (Step S203). Determining whether or not the coding system is a one-byte coding system is equivalent to determining whether or not the coding system normally applied for the disk reproduction apparatus is a two-byte coding system.

If, in Step S203, the coding system indicated by the attribute information included in the text data is not a one-byte coding system (i.e., is a two-byte coding system), the controlling unit 9 determines that the text data is based on a two-byte coding system, which is normally applied in the disk reproduction apparatus, and then the text data is converted (decoded) into characters in accordance with the character coding system (character code information) indicated by the attribute information of the read out text data (Step S204). The characters (display data) obtained by the conversion is sent to the display apparatus 11 so as to be displayed on the screen of the display apparatus 11 (Step S208). Then, the process illustrated in FIG. 6 is completed.

If, in Step S203, the controlling unit 9 determines that the coding system indicated by the attribute information of the text data is a one-byte coding system (i.e., not a two-byte coding system), the controlling unit 9 checks the text data for character codes that are not included in a one-byte system (Step S205).

In Step S205, the controlling unit 9 checks the text data in accordance with the type of one-byte coding system applied. More specifically, characters for the range of values indicated below do not exist in the following coding systems:

ASCII (ISO646), 128 (80h) to 255 (FFh)
ISO8859-1, 128 (80h) to 159 (9Fh)
JISX0201, 128 (80h) to 159 (9Fh) and 224 (E0h) to 255 (FFh)

As described above, in Step S205, the controlling unit 9 checks the text data for character codes that are not included the coding system in accordance with the type of one-byte coding system.

Based on the check results of Step S205, the controlling unit 9 determines whether or not character codes that do not conform to a 1-byte coding system exist (Step S206). If the controlling unit 9 determines that such nonconforming character codes exist, the controlling unit 9 further determines that the coding system indicated by the attribute information of the text data differs from the actual coding system of the character codes of the text data. Then, the text data is converted (decoded) into characters based on a character map of the coding system selected by the user and stored in the EEPROM 10, as illustrated in FIG. 5 (Step S207). The coding system selected by the user is a coding system to be applied to process character codes that are based on a coding system other than the normally applied two-byte coding system.

The characters (display data) obtained by the decoding process in Step S207 are sent to the display apparatus 11 so as to be displayed on the screen of the display apparatus 11 (Step S208). Then, the process illustrated in FIG. 6 is completed.

If, in Step S206, the controlling unit 9 determines that the character codes of the text data to be processed do not include character codes that do not exist in the one-byte coding system, the controlling unit 9 determines that the coding system indicated by the attribute information included in the text data to be processed matches the actual coding system of the character codes of the text data. Then, the character codes of the text data are converted (decoded) into characters based on the coding system indicated by the attribute information (character code information) of the read out text data (Step S204). The characters (display data) obtained by conversion is sent to the display apparatus 11 so as to be displayed on the screen of the display apparatus 11 (Step S208). Then, the process illustrated in FIG. 6 is completed.

If, in Step S202, the coding system of the character code of the text data to be processed is determined to be unknown, the controlling unit 9 determines that the character codes of the text data are based on a coding system other than the normally applied two-byte coding system. Then, the text data is decoded based on a character map of the coding system stored in the EEPROM 10, as illustrated in FIG. 5 (Step S207).

Subsequently, the characters (display data) obtained by the decoding process of Step S207 are sent to the display apparatus 11 so as to be displayed on the screen of the display apparatus 11 (Step S208). Then, the process illustrated in FIG. 6 is completed.

As described above, the disk reproduction apparatus according to this embodiment is capable of decoding character codes of text data using a character map of a coding system specified in advance when the coding system of the text data to be processed is unknown because attribute information is missing or when the actual coding system of the character codes of the text data does not match a one-byte coding system indicated by the attribute information, which is not the two-byte coding system normally applied by the disk reproduction apparatus.

In this way, even when the coding system indicated by the attribute information of the text data to be processed differs from the actual coding system of the character codes of the text data, generation of garbled characters can be minimized and the text data can be converted correctly into characters and presented to the user.

As described above, decoding of text data in accordance with a coding system specified by the user is only carried out when a value (character code) that does not exist in a one-byte code is detected when the text data is checked in Step S205 shown in FIG. 6. As listed above, the coding systems (decoding methods) that can be selected by the user are: 1) Auto (automatic setting); 2) Japanese (Shift-JIS); 3) Korean (KSX1001); 4) simplified Chinese characters used in mainland China (GB18030); 5) Traditional Chinese characters used in Taiwan (Big5); 6) English (ISO8859-1 or ASCII); and 7) Russian (ISO8859-1).

The disk reproduction apparatus may include all of the character coding systems that can be selected by the user or may include a limited number of character coding systems depending on the point of destination. Here, to "include the coding system" means to "include the character maps and processing programs required for the conversion."

In the above, the disk reproduction apparatus was manufactured mainly for use in Japan and thus Shift-JIS was set as the coding system normally applied for converting the text data. However, the disk reproduction apparatus according to the present invention is not limited, and a one-byte coding system, such as ISO8859-1, may be set as the normally applied coding system.

If a one-byte coding system is set as the normally applied coding system, Step S203 of the process shown in FIG. 6 is changed so that the controlling unit 9 determines whether or not the attribute information of the text data to be processed indicates a two-byte coding system. Then, in Step S206, the controlling unit 9 determines whether or not character codes not used in a two-byte coding system are included in the text data.

[Another Decoding Process of Text Data]

Next, another decoding process of the text data carried out by a disk reproduction apparatus according to an embodiment of the present invention will be described with reference to the flow chart illustrated in FIG. 7. The decoding process of text data described above with reference to FIG. 6 was for decoding text data when the Shift-JIS two-byte coding system is set as the normally applied coding system for the disk reproduction apparatus.

However, in most cases, when the coding system indicated by the attribute information of the text data differs from the actual coding system of the character code of the text data, the coding system indicated by the attribute information has been rewritten by ISO8859-1 used for European languages.

Figure 7:
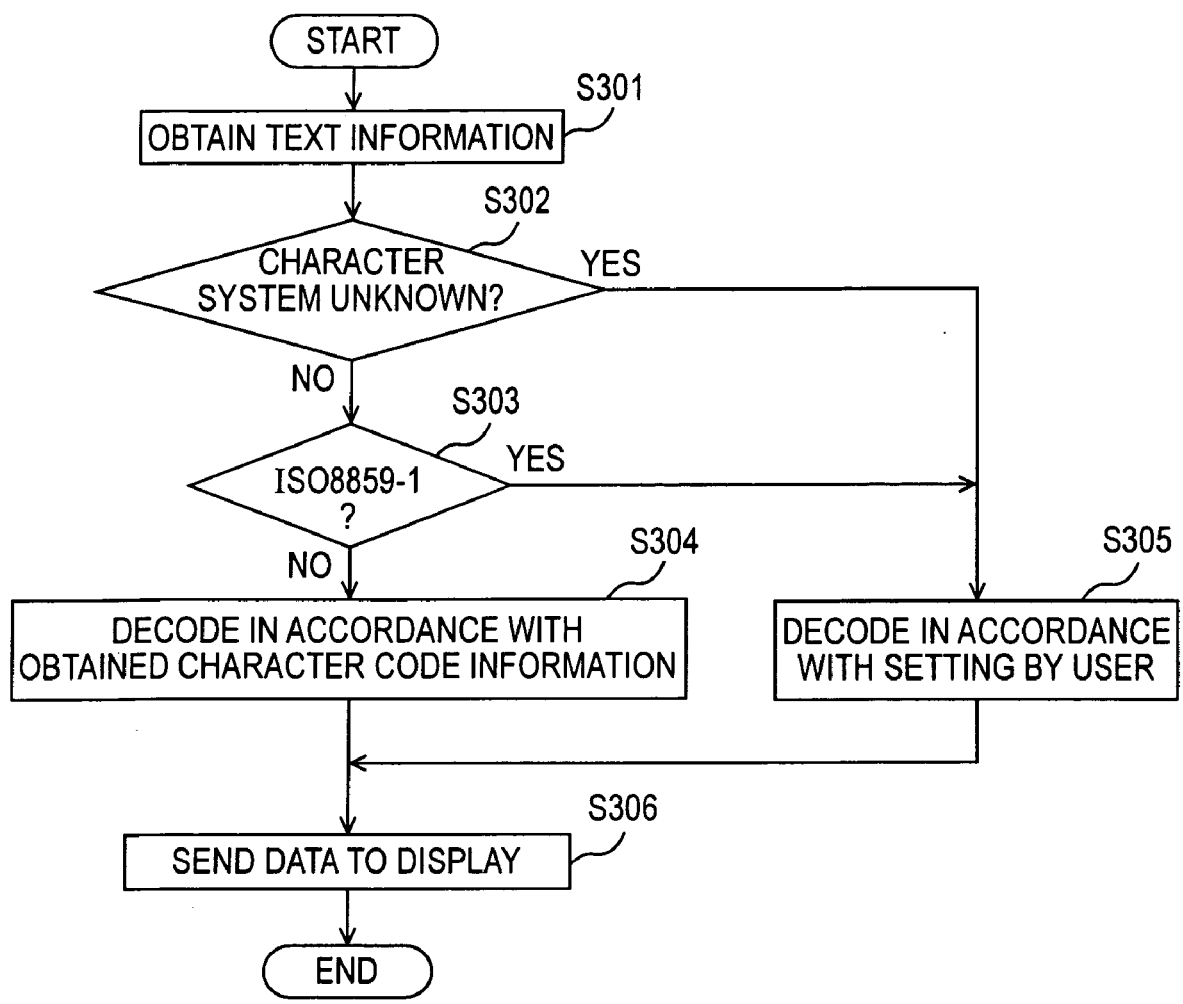
FIG. 7 is a flow chart illustrating another decoding process for text data.

For this reason, the decoding process of text data illustrated in FIG. 7 is carried out in the disk reproduction apparatus when the coding system normally applied for decoding text data is a coding system other than ISO8859-1 and the coding system indicated by the attribute information of the text data is ISO8859-1 and when it is highly probable that the coding system indicated by the attribute information of the text data differs from the actual coding system of the character codes of the text data.

The process illustrated in FIG. 7, similar to the process illustrated in FIG. 6, is carried out mainly in a controlling unit 9 when a disk is loaded or when instructed by the user. When the process illustrated in FIG. 7 is carried out in the controlling unit 9, the controlling unit 9 reads out text data from the disk 1 load on the disk reproduction apparatus via the optical pick-up unit 3, the RF circuit 5, and the DSP 6 (Step S301). Then, the controlling unit 9 refers to the attribute information included in the read out text data and determines whether the coding system of the character codes of the text data is known or unknown (Step S302).

If, in Step S302, the controlling unit 9 determines that the coding system of the character code of the text data to be processed is known, the controlling unit 9 further determines whether the coding system is ISO8859-1 (Step S303). There are two reasons for determining whether the coding system indicated by the attribute information of the text data is ISO8859-1 in Step S303.

The first reason is that the coding system normally applied in the disk reproduction apparatus according to this embodiment for decoding the text data is a coding system other than ISO8859-1 and, therefore, to determine whether the coding system indicated by the attribute information of the text data is ISO8859-1 is equivalent to determining whether the coding system indicated by the attribute information is a coding system other than ISO8859-1.

The second reason is that, as described above, if the coding system indicated by the attribute information of the text data is ISO8859-1, there is a high probability that the coding system indicated by the attribute information of the text data differs from the actual coding system of the character codes of the text data.

If, in Step S303, the controlling unit 9 determines that the attribute information of the text data to be processed does not indicate ISO8859-1, the probability is low that the coding system indicated by the attribute information of the text data differs from the actual coding system of the character codes of the text data. Therefore, the character codes of the text data are converted (decoded) into characters based on the attribute information (character code information) of the text data (Step S304). Then, the characters (display data) obtained by the conversion is sent to the display apparatus 11 so as to be displayed on the screen of the display apparatus 11 (Step S306). Then, the process illustrated in FIG. 7 is completed.

If, in Step S302, the controlling unit 9 determines that the coding system of the character codes of the text data to be processed is unknown and, in Step S303, determines that the attribute information of the text data to be processed indicates ISO8859-1, there is a high probability that the coding system indicated by the attribute information of the text data differs from the actual coding system of the character codes of the text data. Hence, in such a case, a character map of a coding system stored in the EEPROM 10 is applied to convert (decode) the character codes into characters in accordance with the process illustrated in FIG. 5. The coding system is a character coding system other than the character coding system normally applied in the decoding process and is specified by the user (Step S305).

The characters (display data) obtained by the decoding process in Step S305 is sent to the display apparatus 11 so as to be displayed on the screen of the display apparatus 11 (Step S306). Then, the processing illustrated in FIG. 7 is completed.

As described above, according to the decoding process of text data illustrated in FIG. 7, text data can be decoded highly reliably when the coding system normally applied for the character codes is a coding system other than ISO8859-1 by detecting when it is highly probable that the coding system indicated by the attribute information of the text data differs from the actual coding system of the character codes of the text data.

If, in Step S303 of the process illustrated in FIG. 7, the controlling unit 9 determines that the coding system indicated by the attribute information of the text data is ISO8859-1, the controlling unit 9 further checks whether or not the character code of the text data includes character codes that are be used in ISO8859-1. If such character codes are not included, the character codes may decoded based on the attribute information (character code information) obtained in Step S304, whereas, if such character codes are included, the text data may be decoded based on a coding system stored in the EEPROM 10 in Step S305.

FIG. 6 illustrates a case in which the normally applied coding system is a coding system other than ISO8859-1. However, the process illustrated in FIG. 6 can be carried out for cases in which the normally applied coding system is a coding system other than Shift-JIS or JISX0201. In such a case, Step S303 in FIG. 7, the controlling unit 9 determines whether the attribute information of the text data is Shift-JIS or JISX0201, respectively.

As described above, when carrying out a decoding process of converting text data into characters, text data can be highly reliably decoded and generation of garbled characters can be prevented by carrying out the decoding process based on a coding system selected to be applied when the coding system indicated by the attribute information of the text data is a coding system other than the coding system normally applied.

In the disk reproduction apparatuses according to the above-described embodiments, the function of receiving means is realized by the key operation unit 12, the function of storing means is realized by the EEPROM 10, and the functions of determining means, conversion means, and detection means is realized by the controlling unit 9.

Embodiments of the present invention may also be realized by preparing a program corresponding to the flow charts illustrated in FIGS. 5, 6, and 7, storing this program in a ROM of a controlling unit 9 and an EEPROM 10, and executing the program when required.

In the description above, the disk reproduction apparatuses according to embodiments of the present invention were a CD reproduction apparatus conforming to the CD-Text standard. However, the disk reproduction apparatus may include various types of reproduction apparatuses and recording and reproducing apparatuses capable of decoding text data stored in a storage medium, such as a Mini Disc™ (MD) using an MD as a storage medium, and outputting the decoded data. In other words, an embodiment of the present invention may be employed in any type of electronic apparatus in order to decode various character codes including attribute information and character codes.

It should be understood by those skilled in the art that various modifications, combinations, sub-combinations and alterations may occur depending on design requirements and other factors insofar as they are within the scope of the appended claims or the equivalents thereof.

What is claimed is:

1. A character-information conversion apparatus for processing character information including attribute information indicating a coding system and character codes conforming to the coding system and for converting the character codes into characters to be output, the apparatus comprising:

receiving means for receiving an input for specifying a coding system to be applied when decoding character codes conforming to a coding system other than a normally applied coding system;

storage means for storing information indicating the coding system corresponding to the input received via the receiving means;

determining means for determining which coding system the character codes of the character information conform to by referring to the attribute information of the character information to be converted; and conversion means for converting the character codes into characters based on the information stored in the storage means when the determining means is incapable of determining the coding system or when the determining means determines that the coding system determined by referring to the attribute information differs from the normally applied coding system.

2. The character-information conversion apparatus according to claim 1, further comprising:

detection means for detecting whether the character codes included in the character information includes character codes not included in a coding system other than the normally applied coding system when the determining means determines that the coding system indicated by the attribute information differs from the normally applied coding system, and wherein the conversion means converts the character codes into characters based on the information stored in the storage means when the determining means determines that the coding system indicated by the attribute information differs from the normally applied coding system and when the detection means detects that the character information includes character codes not included in a coding system other than the normally applied coding system.

3. The character-information conversion apparatus according to one of claims 1 and 2, wherein the normally applied coding system is a two-byte coding system and the coding system other than the normally applied coding system is a one-byte coding system.

4. The character-information conversion apparatus according to one of claims 1 and 2, wherein the normally applied coding system is a one-byte coding system and the coding system other than the normally applied coding system is a two-byte coding system.

5. A method for processing character information including attribute information indicating a coding system and character codes conforming to the coding system and for converting the character codes into characters to be output, the method comprising the steps of:

storing information indicating the coding system corresponding to the received input by receiving an input for specifying a coding system to be applied when decoding character codes conforming to a coding system other than a normally applied coding system;

determining which coding system the character codes of the character information conform to by referring to the attribute information of the character information to be converted; and converting the character codes into characters based on the information stored in the storage means when the coding system cannot be determined in the determining step or when it is determined in the determining step that the coding system indicated by the attribute information differs from the normally applied coding system.

6. The method according to claim 5, further comprising the step of:

detecting whether the character codes included in the character information include character codes not included in a coding system other than the normally applied coding system when it is determined in the determining step that the coding system indicated in the attribute information differs from the normally applied coding system, wherein the character codes are converted into characters in the converting step based on the information stored in the storage means when it is determined in the determining step that the coding system indicated by the attribute information differs from the normally applied coding system and when it is detected in the detecting step that the character codes included in the character information includes character codes not included in a coding system other than the normally applied coding system.

7. The method according to one of claims 5 and 6, wherein the normally applied coding system is a two-byte coding system and the coding system other than the normally applied coding system is a one-byte coding system.

8. The method according to one of claims 5 and 6, wherein the normally applied coding system is a one-byte coding system and the coding system other than the normally applied coding system is a two-byte coding system.

9. A character-information conversion apparatus for processing character information including attribute information indicating a coding system and character codes conforming to the coding system and for converting the character codes into characters to be output, the apparatus comprising:

a receiving unit for receiving an input for specifying a coding system to be applied when decoding character codes conforming to a coding system other than a normally applied coding system;

a storage unit for storing information indicating the coding system corresponding to the input received via the receiving unit;

a determining unit for determining which coding system the character codes of the character information conform to by referring to the attribute information of the character information to be converted; and a conversion unit for converting the character codes into characters based on the information stored in the storage unit when the determining unit is incapable of determining the coding system or when the determining unit determines that the coding system determined by referring to the attribute information differs from the normally applied coding system.

* * * * *